United States Patent
Seitz

(10) Patent No.: US 7,600,965 B2
(45) Date of Patent: Oct. 13, 2009

(54) FLOW STRUCTURE FOR A TURBOCOMPRESSOR

(75) Inventor: Peter A. Seitz, Steinerweg 1b (DE)

(73) Assignee: MTU Aero Engines GmbH, Munich (DE)

(*) Notice: Subject to any disclaimer, the term of this patent is extended or adjusted under 35 U.S.C. 154(b) by 524 days.

(21) Appl. No.: 11/176,252

(22) Filed: Jul. 8, 2005

(65) Prior Publication Data
US 2007/0196204 A1 Aug. 23, 2007

(30) Foreign Application Priority Data
Jul. 8, 2004 (DE) .................... 10 2004 032 978

(51) Int. Cl.
*F01D 1/12* (2006.01)

(52) U.S. Cl. .............. 415/57.1; 415/57.3; 415/144; 415/169.1; 415/58.5

(58) Field of Classification Search .......... 415/58.5, 415/58.7, 144, 145, 169.1, 173.1, 173.3, 415/220, 914, 57.1–57.4
See application file for complete search history.

(56) References Cited

U.S. PATENT DOCUMENTS

| | | | |
|---|---|---|---|
| 4,329,114 A * | 5/1982 | Johnston et al. ............. 415/145 |
| 4,511,308 A | 4/1985 | Russell et al. | |
| 4,673,331 A | 6/1987 | Kolb | |
| 4,871,294 A | 10/1989 | Ivanov et al. | |
| 5,137,419 A | 8/1992 | Waterman | |
| 5,282,718 A | 2/1994 | Koff et al. | |
| 6,302,640 B1 | 10/2001 | McKelvey | |

FOREIGN PATENT DOCUMENTS

| | | |
|---|---|---|
| DE | 33 22 295 A1 | 2/1984 |
| DE | 35 39 604 C1 | 2/1987 |
| EP | 0 526 965 A2 | 2/1993 |
| GB | 504214 | 4/1939 |
| JP | 59168296 | 9/1984 |
| WO | WO-03/072910 A1 * | 9/2003 |
| WO | WO-03/072949 A1 * | 9/2003 |
| WO | WO-2004/018844 A1 * | 3/2004 |

* cited by examiner

*Primary Examiner*—Christopher Verdier
(74) *Attorney, Agent, or Firm*—Crowell & Moring LLP

(57) ABSTRACT

A turbocompressor flow structure comprises a ring chamber which is arranged concentrically to an axis of a turbocompressor in an area of free blade/vane ends of a rotor blade ring/vane ring and is adjacent radially to a main flow channel. A ring chamber is provided which is bordered by a front upstream wall, a rear downstream wall and a wall that runs essentially axially. Baffle elements are arranged in the ring chamber and the ring chamber permits flow penetration in a circumferential direction in a front and/or rear area. At least one opening is provided in the area of the wall that runs essentially axially or in the area of the upstream wall and permits flow penetration out of the ring chamber, at least one compressor chamber being provided to accommodate this outgoing flow.

28 Claims, 3 Drawing Sheets

FLOW STRUCTURE FOR A TURBOCOMPRESSOR

BACKGROUND AND SUMMARY OF THE INVENTION

This application claims the priority of German Application No. 10 2004 032 978.8 filed Jul. 8, 2004, the disclosure of which is expressly incorporated by reference herein.

The invention relates to a flow structure for a turbocompressor. Preferred embodiments relate to a flow structure for a turbocompressor of a gas turbine, having at least one ring chamber which is arranged concentrically with respect to an axis of the turbocompressor in an area of free blade/vane ends of a rotor blade ring/vane ring and is adjacent radially to a main flow channel, whereby the ring chamber is bordered by a front upstream wall, a rear downstream wall and a wall extending essentially axially, whereby baffle elements are arranged in the ring chamber and whereby the ring chamber permits flow penetration in a circumferential direction in a front and/or rear area.

In addition, the invention relates to a turbocompressor and an aircraft engine and a stationary gas turbine.

Flow structures, i.e., circulation structures for turbocompressors are known in the form of so-called casing treatments and hub treatments. The primary function of casing treatments and hub treatments is to increase the aerodynamically stable operating range of a compressor by optimizing the surge limit interval. An optimized surge limit interval permits higher compressor pressures and thus a higher compressor load. The disturbances responsible for local flow breakaway and ultimately for pumping of the compressor occur on the casing ends of the rotor blades of one or more compressor stages and/or on the hub ends, which are on the inside radially, of the guide vanes, because the aerodynamic load in the compressor is greatest in these ranges. In the area of the blade/vane ends, the flow is stabilized by flow structures, i.e., circulation structures. Such circulation structures allow axial flow as well as flow penetration in the circumferential direction. Flow structures in the area of the casing ends of the rotor blades are referred to as "casing treatments", while flow structures in the area of the hub ends of the guide vanes are referred to as "hub treatments".

German Patent DE 33 22 295 C3 (corresponding U.S. Pat. No. 4,871,294) discloses an axial fan having a circulation structure. The axial fan according to this German Patent DE 33 22 295 C3 includes a ring chamber arranged concentrically with an axis of the axial fan in the area of free ends of a rotor blade ring, with the ring chamber being connected radially to a main flow channel. Baffle elements are fixedly arranged in the ring chamber. The circulation structure according to this state of the art permits flow axially and circumferentially. Characteristic of this type of circulation structures is a closed ring, which is flush with the contour of the main flow channel and separates the rear admission area of the circulation structure from the forward exit area of same and forms a smooth closed surface area.

U.S. Pat. No. 5,282,718 discloses a casing treatment having baffles arranged in a ring chamber. Again in this casing treatment, the admission area and the exit area of the circulation structure are separated by a solid closed ring, which is smooth in the direction of the vanes and blades. Such rings in the area of the vanes and blades must be provided with a strip coating or intake coating for the case of contact with the tips of the vanes and blades.

Another casing treatment is known from U.S. Pat. No. 5,137,419. Axial grooves and/or axially inclined grooves are provided with the circulation structure disclosed in that patent for improving the surge limit interval of a compressor in an axial design. However, with the circulation structure disclosed there, flow penetration in the circumferential direction is not possible.

Other circulation structures for turbocompressors are known from U.S. Pat. No. 4,511,308 and German Patent DE 35 39 604 C1 (corresponding U.S. Pat. No. 4,673,331).

In addition, it is already known in the state of the art that in the compressor area between neighboring vane rings and rotor blade rings, air may be branched off through openings in the compressor casing—so-called bleed slots—and this air is used, e.g., as compartment air or as cooling air for the turbine. However, this has a negative influence on the flow conditions prevailing at the downstream rotor blade grid in the sense of a reduction in the surge limit interval.

Against this background, the present invention is based on the problem of creating a novel flow structure for a turbocompressor which will permit in particular branching off of compressor air without any disadvantage from an aerodynamic standpoint.

This problem is solved by providing a flow structure for a turbocompressor of a gas turbine, having at least one ring chamber which is arranged concentrically with respect to an axis of the turbocompressor in an area of free blade/vane ends of a rotor blade ring/vane ring and is adjacent radially to a main flow channel, whereby the ring chamber is bordered by a front upstream wall, a rear downstream wall and a wall extending essentially axially, whereby baffle elements are arranged in the ring chamber and whereby the ring chamber permits flow penetration in a circumferential direction in a front and/or rear area, wherein, in the area of at least one of the walls, at least one opening is provided which permits flow penetration out of the ring chamber, and wherein there is at least one compressor chamber to receive this emerging flow.

According to this invention, at least one opening is provided in the area of at least one of the walls, permitting flow penetration out of the ring chamber, at least one compressor chamber being provided to accommodate the outgoing air.

The inventive flow structure acts at least partially as a casing treatment and/or a hub treatment with all the advantages in this regard and permits air to be branched off in an aerodynamically optimized manner. The present invention thus permits air circulation on the one hand while on the other hand also allowing air to be branched off. If no air is branched off, the air circulation acts exclusively as a casing treatment and/or hub treatment.

According to an advantageous embodiment of the invention, the baffle elements on the one hand border flow channels running primarily in the axial direction and on the other hand border at least one flow channel running in the circumferential direction, the opening or each opening being arranged on an upstream end of the flow channels running in the axial direction.

Preferably a medium, namely air, which flows into the compressor chamber through the flow channels running in the axial direction and through the opening or each opening, can be removed from the compressor chamber through an outlet opening.

The inventive flow structure is advantageously incorporated in turbocompressors for aircraft engines and stationary gas turbine engines.

Preferred embodiments of the present invention are derived from the dependent claims and the description below.

Exemplary embodiments of this invention will now be explained in greater detail on the basis of the drawing without being limited to that.

Other objects, advantages and novel features of the present invention will become apparent from the following detailed description of the invention when considered in conjunction with the accompanying drawings.

DETAILED DESCRIPTION OF THE DRAWINGS

The present invention is described in greater detail below with reference to FIG. 1 through FIG. 4.

Figure 1:
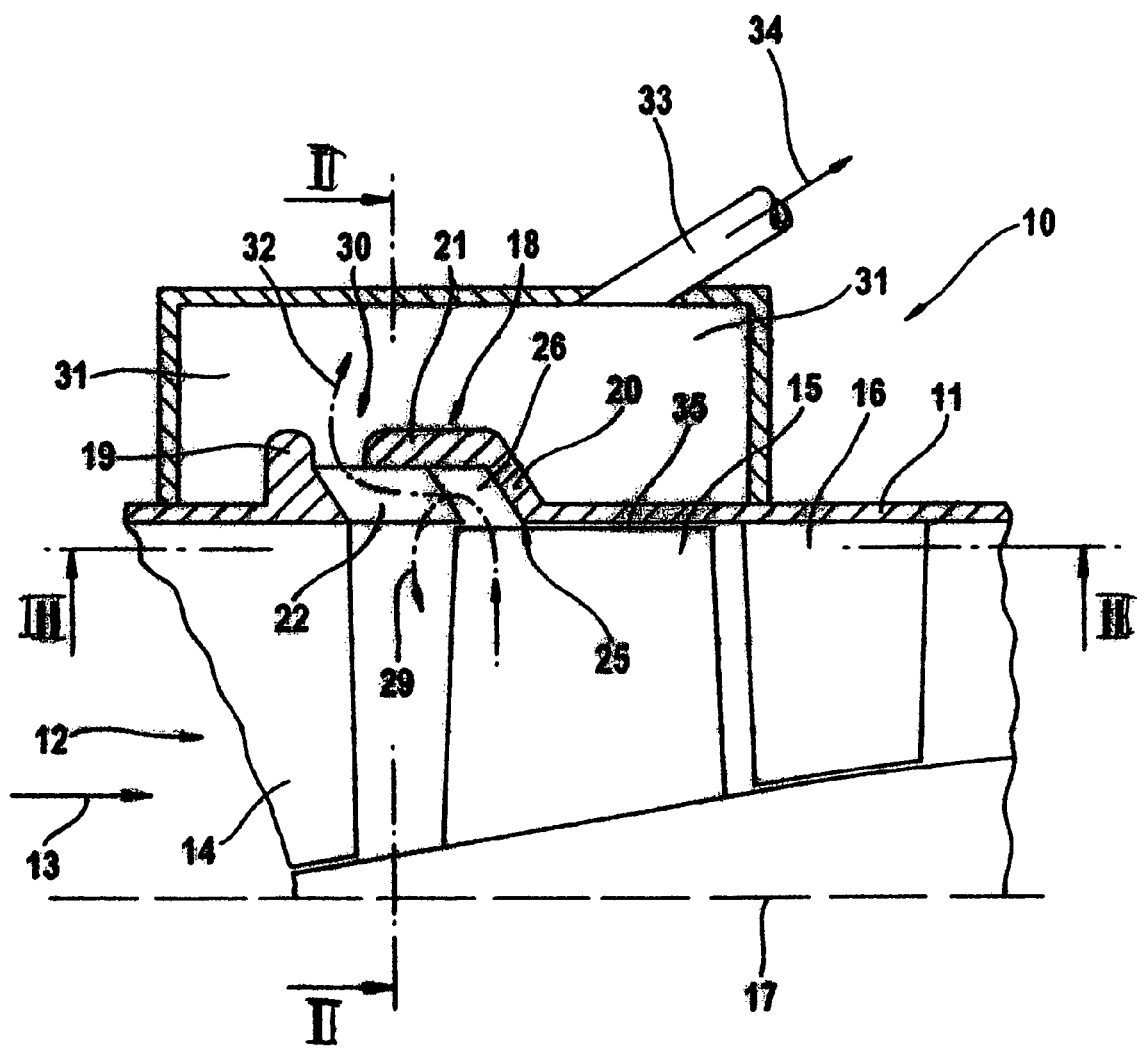
FIG. 1 shows a partial longitudinal section through a compressor in an axial design in an area of a flow structure on the casing end, constructed according to a preferred embodiments of the present invention.

FIG. 1 shows a partial longitudinal section through a compressor 10 in an axial design, with a casing 11 of the compressor 10 bordering a main flow channel 12. The direction of flow through the main flow channel 12 is represented by an arrow 13 in FIG. 1.

Several stationary guide vanes and several rotating rotor blades are arranged in succession in the axial direction in the main flow channel 12. The detail of the compressor 10 according to FIG. 1 shows a first vane ring 14, with a rotor blade ring 15 situated behind this first vane ring 14 in the direction of flow and a vane ring 16 being situated downstream in the direction of flow from the rotor blade ring 15 in the main flow channel 12. The rotating rotor blades of the rotor blade ring 15 rotate together with a rotor with respect to the stationary casing 11 and with respect to the stationary guide vanes of the vane rings 14 and 16. FIG. 1 shows an axis of rotation 17 of the rotor with which the blades rotate.

A ring chamber 18 is radially adjacent to the main flow channel 12 according to FIG. 1. The ring chamber 18 is bordered by a wall 19 that is on the front axially, a wall 20 that is on the rear axially and a wall 21 that is on the outside radially. The axially front wall 19 and the axially rear wall 20 run essentially radially. The wall 21 which is on the outside radially runs essentially axially. The ring chamber 18 in the exemplary embodiment shown here is assigned to the casing ends 35 of the rotor blades of the rotor blade ring 15. It should be pointed out that such a ring chamber may also be provided for the hub ends of the guide vanes of the vane rings 14 and 16 that are on the inside radially.

Figure 2:
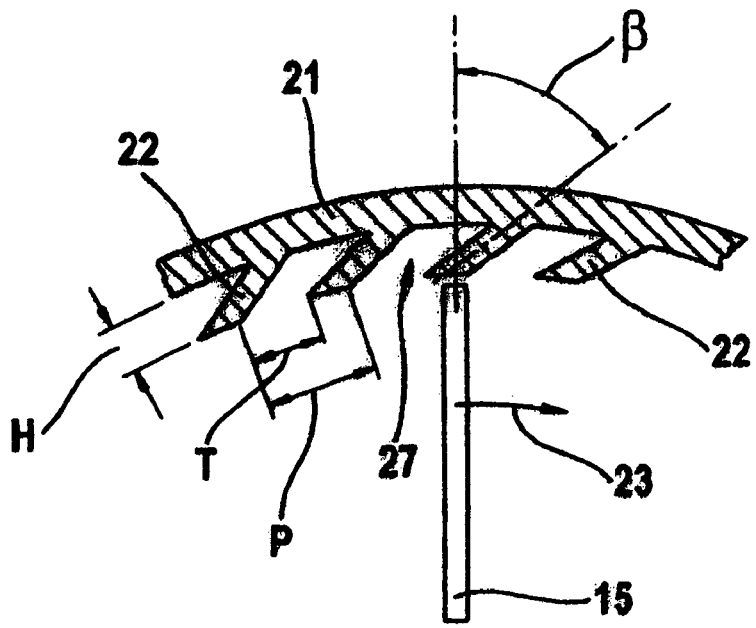
FIG. 2 shows a partial cross section through the arrangement according to FIG. 1 along the direction of the section line II-II in FIG. 1.

Baffle elements 22 are provided in the ring chamber 18. The diagram in FIG. 2 indicates that the baffle elements 22 are inclined at an angle β to the rotor blades of the rotor blade ring 15, i.e., with respect to a radial line. The diagram according to FIG. 2 shows the baffle elements from an axial direction of view. In the circumferential direction, the baffle elements are inclined by the angle β to the rotor blades of the rotor blade ring 15. The angle β is selected so that a flow outlet from the main flow channel 12 into the ring chamber 18 is facilitated from an aerodynamic standpoint and thus does not involve great losses. The direction of rotation of the rotor blade ring 15 is indicated with the arrow 23 in FIG. 2. It should be pointed out here that the angle of inclination β need not be constant in the circumferential direction as in the exemplary embodiment shown here but instead may vary in the circumferential direction. The baffle elements then have a curved course in the circumferential direction. The angle of inclination β may drop to a value of "zero" from the inside radially to the outside with appropriately curved baffle elements. In each case, the angle β is selected so that the flow admission into the ring chamber 18 is optimized. As FIG. 2 indicates, the baffle elements 22 are characterized not only by the angle β but also by their radial height H and by their distance in the circumferential direction, which is defined by the characteristic quantities T and P.

Figure 3:
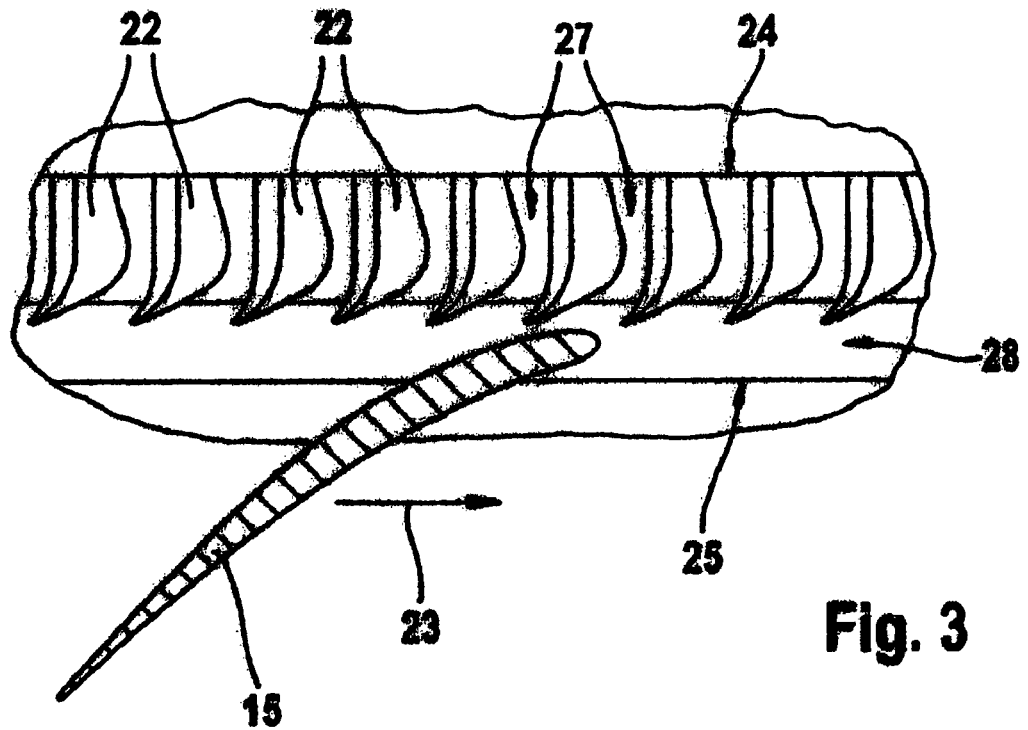
FIG. 3 shows a partial cross section through the arrangement according to FIG. 1 along the direction of the section line III-III in FIG. 1.

The baffle elements 22 are designed like blades and have a three-dimensionally-curved profile with a varying thickness. This can be seen in particular in the diagram according to FIG. 3. FIG. 3 shows the profiling of the baffle elements 22 and of the rotor blades of the rotor blade ring 15, whereby the direction of rotation of the rotor blade ring 15 is again represented by the arrow 23. FIG. 3 shows that the flow should exit in the area of an upstream edge 24 of the ring chamber 18 in relation to the rotor blade ring 15 with a counter twist. A downstream edge of the ring chamber 18 is labeled with reference number 25 in FIG. 3.

As FIG. 1 shows, the baffle elements 22 within the ring chamber 18 do not extend over the entire axial length of the ring chamber 18, but instead the baffle elements 22 leave a recess 26 free in the area of the rear wall 20 axially—i.e., on the downstream edge 25. The baffle elements 22 thus border several flow channels 27 running in the axial direction and a flow channel 28 running in the circumferential direction. Thus, in addition to recirculation running mainly axially, flow in the circumferential direction is also possible within the ring chamber 18. The recirculation running in the axial direction is indicated with the arrow 29 in FIG. 1.

It should be pointed out here that in contrast with the exemplary embodiment shown, baffle elements may also be arranged in the ring chamber, leaving recesses free in the area of the front wall 19 axially as well as in the area of the rear wall 20 axially, thus permitting flow penetration in the circumferential direction. In the exemplary embodiment in FIG. 1, such a recess 26 is provided only in the area of the rear wall 20 axially. In addition, in the sense of the present invention, it is possible for the recess defined by the baffle elements to be positioned exclusively in the area of the front wall 19 axially to ensure flow penetration in the circumferential direction.

FIG. 1 shows that the ends of the baffle elements 22 facing the main flow channel 12 run on a contour of the main flow channel 12 and overlap axially with free ends 35 of the blades of the rotor blade ring 15. The ends of the baffle elements 22 facing the main flow channel 12 are at such a distance radially from the free ends 35 of the rotor blades of the rotor blade ring 15 that during normal operation of the turbocompressor, the baffle elements 22 do not come in contact with the free ends 35 of the rotor blades of the rotor blade ring 15. It should be pointed out here that the baffle elements 22 may be made of a metal such as steel or a nickel-based alloy or a cobalt-based alloy. In addition, it is possible for the baffle elements 22 to be made of a light metal such as aluminum or a plastic, e.g., thermoplastics, thermoset plastics or elastomers. The ring chamber 18 may be designed in one piece, including the baffle elements 22, or at least as two segments adjacent to one another in the circumferential direction. In the case when the ring chamber 18 and the baffle elements 22 are designed as two segments, the baffle elements 22 are detachably mounted in the ring chamber 18.

In the sense of the present invention, at least one opening 30 is provided in an upstream area of the ring chamber 18, as seen in the main direction of flow, said opening permitting flow penetration out of the ring chamber 18 and into a compressor chamber 31. In the exemplary embodiment shown in FIG. 1, the opening, i.e., recess 30 is integrated into the wall 21 of the ring chamber 18, said wall running essentially in the axial direction. The opening 30 is provided in an area of the wall 21 that is on the outside radially and is connected to the wall 19 that is at the front axially. The opening or each opening 30 in the area of the wall 21, running essentially in the axial direction, is thus provided on an upstream end. The opening or each opening 30 in the area of the wall 21 of the ring chamber 18 running essentially in the axial direction permits flow penetration in the radial direction out of the ring chamber 18 and into a compressor chamber 31. The compressor chamber 31 may also be referred to as a compressor antechamber. The flow penetration out of the ring chamber 18 and into the compressor chamber 31 is indicated by the arrow 32 in FIG. 1. The flow in the area of the ring chamber 18 thus facilitates recirculation back into the main flow channel 12 on the one hand while on the other hand facilitating circulation out of the main flow channel 12 and into the compressor antechamber 31.

In contrast with the exemplary embodiment shown here, it is also possible to introduce the opening or each opening 30 into the front wall 19 axially. Then the opening will also be situated in an upstream area of the ring chamber 18.

According to FIG. 1, the medium flowing out of the ring chamber 18 and into the compressor chamber 31 can be removed from the compressor chamber 31 through an outlet opening 33, which is indicated by an arrow 34 in FIG. 1. The compressor chamber 31 is connected radially to the ring chamber 18 and surrounds the ring chamber 18 on the outside radially.

In conjunction with the exemplary embodiment illustrated in FIG. 1 through FIG. 3, it should be pointed out here that the axial center of the ring chamber 18 is situated upstream from the axial center of the respective rotor blade ring 15. This should be understood to mean that the axial center of the ring chamber 18 on the respective wall of the main flow channel 12 is situated upstream from the axial center of the free ends 35 of the rotor blades of the rotor blade ring 15.

Figure 4:
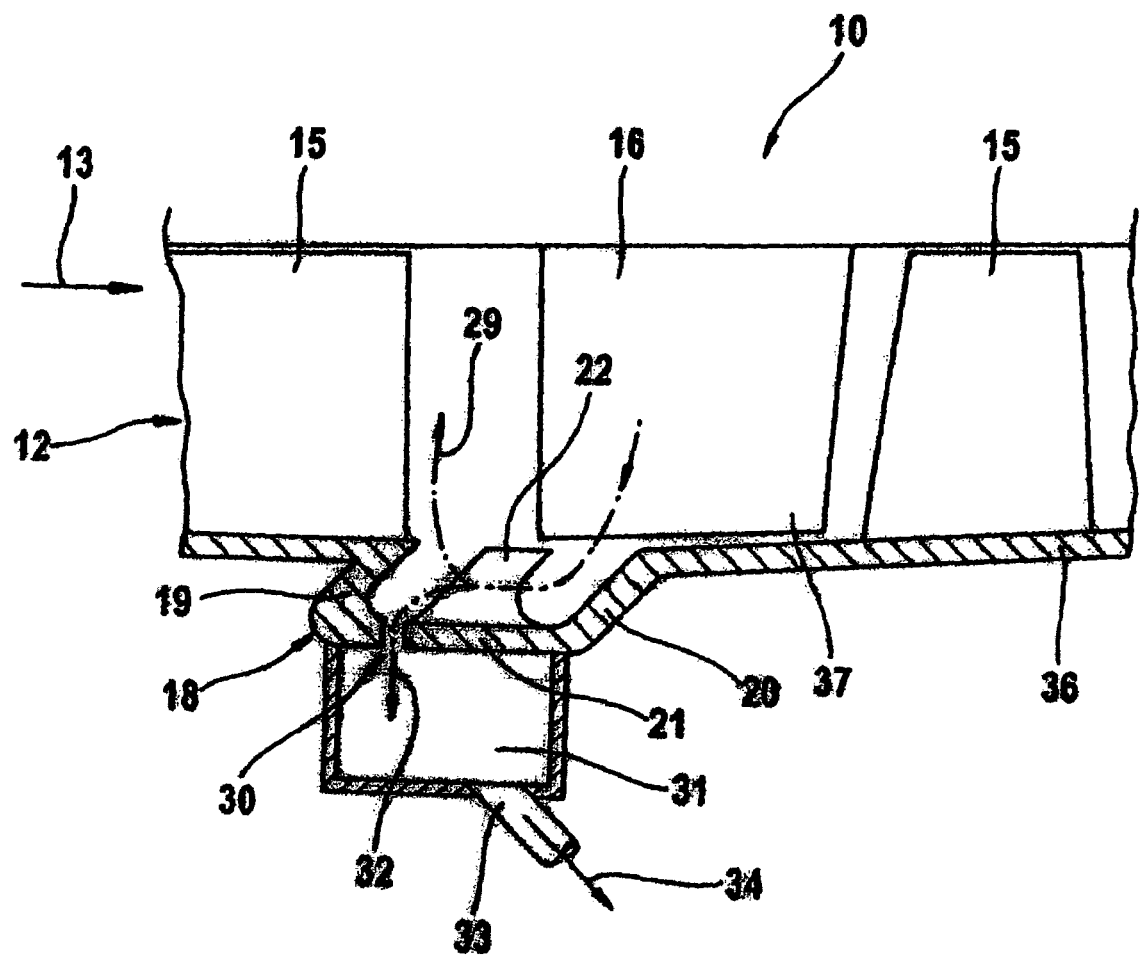
FIG. 4: shows a partial longitudinal section through a compressor in an axial design in an area of an inventive flow structure on the hub end constructed according to another preferred embodiment of the present invention.

With reference to FIG. 1 through FIG. 3, the inventive flow structure has been described on the example of a ring chamber that forms a casing treatment. As mentioned previously, the inventive flow structure can also be used in the area of the hub ends of stationary guide vanes of a vane ring, forming a so-called hub treatment. FIG. 4 shows a partial longitudinal section through a compressor in which the inventive flow structure is developed in the area of the hub of a compressor rotor as a hub treatment.

FIG. 4 again shows a compressor 10 in an axial design, with multiple stationary vane rings and multiple rotating rotor blade rings being arranged one after the other in the axial direction in the main flow channel 12 of the compressor 10. FIG. 4 shows in this regard a rotor blade ring 15, with a vane ring 16 being situated downstream from this rotor blade ring 15 in the direction of flow and a rotor blade ring 15 also being positioned downstream from the vane ring 16 in the direction of flow. The main flow channel 12 is bordered at the hub end by an outside contour of a hub 36.

In contrast with the exemplary embodiment illustrated in FIG. 1 through FIG. 3, the ring chamber 18 in the exemplary embodiment in FIG. 4 is not situated on the casing end on the outside radially but instead is provided on the hub end on the inside radially. The ring chamber 18 is assigned to the free ends 37 of the stationary guide vanes of the vane ring 16. With regard to the other details, the hub-end flow structure of the exemplary embodiment according to FIG. 4 corresponds to the casing end flow structure in the exemplary embodiment according to FIG. 1 through FIG. 3, so to avoid unnecessary repetition, the same reference numbers are used for identical modules. Reference may be made here to the statements made regarding the exemplary embodiment in FIG. 1 through FIG. 3.

With the help of the inventive flow structure for a turbocompressor, recirculation is thus possible within the main flow channel on the one hand while on the other hand circulation out of the main flow channel and into the compressor antechamber is also possible. This is made possible through the ring chamber designed according to the present invention. The inventive flow structure results in optimization of the pump border interval of the turbocompressor. This can be used with turbocompressors in the axial design as well as turbocompressors in the diagonal design or radial design. The inventive flow structure is preferably used in aircraft engines or stationary gas turbines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. Flow structure for a turbocompressor of a gas turbine, having at least one ring chamber which is arranged concentrically with respect to an axis of the turbocompressor in an area of free blade/vane ends of a rotor blade ring/vane ring and is adjacent radially to a main flow channel, whereby the ring chamber is bordered by a front upstream wall, a rear downstream wall and a wall extending essentially axially, whereby baffle elements are arranged in the ring chamber and whereby the ring chamber permits flow penetration in a circumferential direction, wherein in the area of at least one of the walls, at least one opening is provided which permits flow penetration out of the ring chamber, wherein there is at least one compressor chamber to receive this emerging flow, and wherein the baffle elements on one end border flow channels running mainly in an axial direction and on another end they border at least one flow channel running in the circumferential direction, whereby the opening or each opening is provided on an upstream end of the flow channels running in the axial direction in the wall extending essentially axially.

2. The flow structure as claimed in claim 1, whereby the opening or each opening allows flow penetration in the radial direction out of the ring chamber and into the compressor chamber.

3. Flow structure as claimed in claim 1, wherein the compressor chamber has an outlet opening through which air flowing out of the ring chamber and into the compressor chamber can be removed from the compressor chamber.

4. Flow structure as claimed in claim 1, wherein the compressor chamber is radially adjacent to the ring chamber.

5. Flow structure according to claim 1, wherein the compressor chamber surrounds the ring chamber on a radially outer side of the ring chamber.

6. Flow structure according to claim 1, wherein the compressor chamber surrounds the ring chamber on a radially inner side of the ring chamber.

7. Flow structure as claimed in claim 1, wherein ends of the baffle elements facing the main flow channel run on and/or near a contour of the main flow channel and overlap axially with free blade/vane ends or are adjacent axially to an area of the free blade/vane ends.

8. Flow structure as claimed in claim 7, wherein ends of the baffle elements facing the main flow channel are at a distance from the free blade/vane ends of the turbocompressor in the radial direction so that in normal operation of the turbocompressor the baffle elements do not come in contact with the free blade/vane ends.

9. Flow structure as claimed in claim 1, wherein the ring chambers, the baffle elements and the compressor chambers are integrated into a casing of the turbocompressor.

10. Flow structure as claimed in claim 1, wherein an axial center of the ring chamber is situated upstream from the axial center of the respective rotor blade ring/vane ring.

11. Flow structure as claimed in claim 10, wherein the axial center of the ring chamber is situated on a respective main flow channel wall upstream from the axial center of the free blade/vane ends of the respective rotor blade ring/vane ring.

12. Turbocompressor in axial design, having at least one flow structure as claimed in claim 11.

13. Aircraft engine having a turbocompressor as claimed in claim 12.

14. Stationary gas turbine having a turbocompressor as claimed in claim 12.

15. Turbocompressor in diagonal design, having at least one flow structure as claimed in claim 11.

16. Aircraft engine having a turbocompressor as claimed in claim 15.

17. Stationary gas turbine having a turbocompressor as claimed in claim 15.

18. Turbocompressor in radial design, having at least one flow structure as claimed in claim 11.

19. Aircraft engine having a turbocompressor as claimed in claim 18.

20. Stationary gas turbine having a turbocompressor as claimed in claim 18.

21. Flow structure for a turbocompressor of a gas turbine, having at least one ring chamber which is arranged concentrically with respect to an axis of the turbocompressor in an area of free blade/vane ends of a rotor blade ring/vane ring and is adjacent radially to a main flow channel, whereby the ring chamber is bordered by a front upstream wall, a rear downstream wall and a wall extending essentially axially, whereby baffle elements are arranged in the ring chamber and whereby the ring chamber permits flow penetration in a circumferential direction,
    wherein in the area of at least one of the walls, at least one opening is provided which permits flow penetration out of the ring chamber, wherein there is at least one compressor chamber to receive this emerging flow, and
    wherein the baffle elements are inclined by an angle β in the circumferential direction as seen in an axial direction of observation or they are curved in the circumferential direction.

22. Flow structure according to claim 21, wherein the angle β is selected so that the admission of flow into the ring chamber from the main flow channel is facilitated from an aerodynamic standpoint.

23. Flow structure for a turbocompressor of a gas turbine, having at least one ring chamber which is arranged concentrically with respect to an axis of the turbocompressor in an area of free blade/vane ends of a rotor blade ring/vane ring and is adjacent radially to a main flow channel, whereby the ring chamber is bordered by a front upstream wall, a rear downstream wall and a wall extending essentially axially, whereby baffle elements are arranged in the ring chamber and whereby the ring chamber permits flow penetration in a circumferential direction,
    wherein in the area of at least one of the walls, at least one opening is provided which permits flow penetration out of the ring chamber, wherein there is at least one compressor chamber to receive this emerging flow, and
    wherein the baffle elements are designed like blades/vanes having a three-dimensional curvature, a varying thickness and defined profile sections.

24. Flow structure for a turbocompressor of a gas turbine, having at least one ring chamber which is arranged concentrically with respect to an axis of the turbocompressor in an area of free blade/vane ends of a rotor blade ring/vane ring and is adjacent radially to a main flow channel, whereby the ring chamber is bordered by a front upstream wall, a rear downstream wall and a wall extending essentially axially, whereby baffle elements are arranged in the ring chamber and whereby the ring chamber permits flow penetration in a circumferential direction,
    wherein in the area of at least one of the walls, at least one opening is provided which permits flow penetration out of the ring chamber, wherein there is at least one compressor chamber to receive this emerging flow, and
    wherein the ring chambers, the baffle elements and the compressor chambers are integrated into a hub of the turbocompressor.

25. Gas turbine turbocompressor assembly comprising:
    a main flow channel, rotatable rotor blades and fixed vanes extending into said main flow channel,
    a ring chamber disposed radially adjacent the main flow channel, said ring chamber being bordered by a front upstream wall, a rear downstream wall and an axially extending wall,
    baffle elements disposed in the ring chamber to guide air from the main flow channel into the ring chamber,
    a compressor chamber disposed radially adjacent the ring chamber at a radial side of the ring chamber opposite from the main flow channel, and
    at least one opening in said ring chamber which permits flow of a portion of the air from the ring chamber to said compressor chamber,
    wherein the baffle elements on one end border flow channels running mainly in an axial direction and on another end they border at least one flow channel running in a circumferential direction, whereby the opening or each opening is provided on an upstream end of the flow channels running in the axial direction in the wall extending essentially axially.

26. Gas turbine turbocompressor assembly according to claim 25, wherein the compressor chamber surrounds the ring chamber on a radially outer side of the ring chamber.

27. Gas turbine turbocompressor assembly according to claim 25, wherein the compressor chamber surrounds the ring chamber on a radially inner side of the ring chamber.

28. Gas turbine turbocompressor assembly according to claim 25, wherein ends of the baffle elements facing the main flow channel run on and/or near a contour of the main flow channel and overlap axially with free blade/vane ends or are adjacent axially to an area of the free blade/vane ends.

* * * * *

UNITED STATES PATENT AND TRADEMARK OFFICE
CERTIFICATE OF CORRECTION

| | |
|---|---|
| PATENT NO. | : 7,600,965 B2 |
| APPLICATION NO. | : 11/176252 |
| DATED | : October 13, 2009 |
| INVENTOR(S) | : Peter A. Seitz |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Fifth Day of October, 2010

David J. Kappos
*Director of the United States Patent and Trademark Office*